(12) United States Patent
Yamamuro

(10) Patent No.: US 6,803,943 B2
(45) Date of Patent: Oct. 12, 2004

(54) MARINE PLANT FIELD SURVEY METHOD AND SURVEY SYSTEM UTILIZING THE SURVEY METHOD

(75) Inventor: Masumi Yamamuro, Tsukuba (JP)

(73) Assignee: Agency of Industrial Science & Technology, Ministry of International Trade & Industry, Tokyo (JP)

( * ) Notice: Subject to any disclaimer, the term of this patent is extended or adjusted under 35 U.S.C. 154(b) by 390 days.

(21) Appl. No.: 09/729,267

(22) Filed: Dec. 5, 2000

(65) Prior Publication Data

US 2002/0024594 A1 Feb. 28, 2002

(30) Foreign Application Priority Data

Aug. 22, 2000 (JP) ........................................ 2000-251588

(51) Int. Cl.[7] .............................................. H04N 7/18
(52) U.S. Cl. ........................................................ 348/81
(58) Field of Search .......................... 114/312; 324/326; 348/61, 81, 82; 340/850; 367/6, 131, 133, 134; 405/154.1, 158, 136; 441/36; H04N 7/18

(56) References Cited

U.S. PATENT DOCUMENTS

| | | | |
|---|---|---|---|
| 3,099,913 A | | 8/1963 | Melton et al. |
| 4,010,619 A | | 3/1977 | Hightower et al. |
| 4,227,479 A | * | 10/1980 | Gertler et al. ............... 340/850 |
| 4,388,710 A | * | 6/1983 | Pecon, Jr. ................. 405/154.1 |
| 4,422,799 A | * | 12/1983 | Green et al. ................. 405/158 |
| 5,570,222 A | | 10/1996 | Chovan |
| 5,597,335 A | * | 1/1997 | Woodland ..................... 441/36 |
| 5,764,061 A | * | 6/1998 | Asakawa et al. ........... 324/326 |
| 6,163,503 A | * | 12/2000 | Gudbjornsson ................ 367/6 |
| 6,304,289 B1 | * | 10/2001 | Sakai et al. .................... 348/81 |
| 6,366,533 B1 | * | 4/2002 | English ....................... 367/131 |

FOREIGN PATENT DOCUMENTS

| | | |
|---|---|---|
| DE | 1 273 357 | 7/1968 |
| GB | 1 444 752 | 8/1976 |
| JP | 10-020382 | 1/1998 |
| JP | 11-131523 | 5/1999 |
| JP | 11-139390 | 5/1999 |

OTHER PUBLICATIONS

T. Masuda, et al., No. 433, pp. 17–21, "Distribution of Organism in Rapids Self Harbors", 1989, no translation.
H. Yagi, No. 27, pp. 34–39, "Investigating for Isoyake in Southwest Seashore in Sakhalin", 1994, no translation.

* cited by examiner

*Primary Examiner*—Richard Lee
(74) *Attorney, Agent, or Firm*—Oblon, Spivak, McClelland, Maier & Neustadt, P.C.

(57) ABSTRACT

A marine plant field survey method includes the step of using a submarine mobile video system capable of taking images underwater to measure degree of macrophyte coverage in a marine plant field by taking wide-field images of macrophytes from above and a step of using the submarine mobile video system to discriminate species of macrophytes by taking images of macrophytes from a direction other than from above. A marine plant survey system includes a camera for taking wide-field images of macrophytes from above and a camera for taking images of macrophytes from a direction other than from above.

7 Claims, 2 Drawing Sheets

MARINE PLANT FIELD SURVEY METHOD AND SURVEY SYSTEM UTILIZING THE SURVEY METHOD

BACKGROUND OF THE INVENTION

1. Field of the Invention

This invention relates to a marine plant field survey method for surveying marine plant fields, particularly tropical and subtropical sea grass beds, for acquiring information useful for preserving the ecosystems of such fields, including information regarding marine plant distribution in the field, the degree of macrophyte coverage, and species of macrophytes at marine plant fields, and to a survey system utilizing the survey method.

2. Description of the Prior Art

Marine plant fields having large macrophyte communities play an important role as places where a great variety of fishes and shellfishes spawn and grow as well as sites that operate as water purifiers. In particular, subtropical and tropical sea grass beds are indispensable for ensuring the survival of sea turtles, dugongs and other large endangered animals.

In the conventional method of observing marine plants and degree of coverage by marine plants and other macrophytes at coastal marine plant fields, the area of the marine plant field is first estimated from photographs taken from above the sea surface (aerial photographs). Skilled divers with expert knowledge in the field then set meter-square quadrats at prescribed locations on the seabed. An underwater camera is used to photograph the quadrats from above and, in addition, the macrophytes in the quadrats are visually examined, photographed at close range, and collected as specimens for determining their species. The collected information is used to determine the species of macrophytes and their degree of coverage at the prescribed locations.

At tropical and subtropical marine plant fields, however, data reflecting the actual situation cannot be obtained by such underwater observation only at selected spots because various kinds of macrophytes differing in size and form live in such fields. At subtropical marine plant fields, moreover, some species live at a depth of more than 10 m from the sea surface, so that estimates of the habitat area based on aerial photographs include a large margin of error.

On the other hand, using divers to collect data is difficult because the divers must be highly skilled and possess expert knowledge in the field. Such people are hard to find and train. In addition, the length of time that a diver can continue to work underwater, though depending on the underwater environment and safety concerns, is severely limited, making the work highly inefficient. Another problem is that divers who differ in skill and knowledge must work individually. The objectivity of the gathered data is low in proportion. Still another is that positional information is hard to obtain with regard to the quadrats that the divers install at specific locations on the seabed.

An object of the present invention is to provide a survey method and a survey system for implementing the survey method that enable information, including positional information, to be accurately acquired directly over a wide area regarding marine plant distribution and degree of coverage and species of macrophytes at marine plant fields, while minimizing exposure of survey personnel to dangers.

Another object of the invention is to provide a marine plant field survey method and survey system that do not require a skilled diver with expert knowledge, are much safer than methods and systems requiring underwater work, and can be operated efficiently with no particular limitation on work period.

SUMMARY OF THE INVENTION

The present invention achieves these objects by providing a marine plant field survey method comprising a step of using a submarine mobile video system capable of taking images underwater to measure degree of macrophyte coverage in a marine plant field by taking wide-field images of macrophytes from above and a step of using the submarine mobile video system to discriminate species of macrophytes by taking images of macrophytes from a direction other than from above.

The invention further provides a survey system for surveying a marine plant field comprising a camera for taking wide-angle images of macrophytes from above and a camera for taking images of macrophytes from a direction other than from above.

The survey system can comprise a stationary image-taking system for taking wide-angle images of macrophytes from above and a movable image-taking system for taking images of macrophytes from a direction other than from above.

The survey system can further include a video monitor and the submarine mobile video system be linked with the monitor to enable image taking simultaneously with acquisition of information regarding the submarine mobile video system operating state and seabed state and discrimination of macrophyte coverage degree and species.

The survey system can further include three or more acoustic transponders installed on the seabed and a transceiver mounted on the submarine mobile video system and the submarine mobile video system be adapted to determine position by measuring the distance between the transceiver and each of the acoustic transponders.

The survey system can be configured so that an operator on board ship can follow the progress of the submarine mobile video system and conditions at the seabed on a monitor displaying the images taken by the camera that images macrophytes at a wide angle (around 90°) from above and the camera that images macrophytes from a direction other than from above and, based thereon, can operate a remote controller for imaging macrophytes and record the image data using an onboard video recorder.

The survey system therefore eliminates the need for skilled divers with expert knowledge, makes the survey work much safer than when conducted by divers working underwater, is under little limitation regarding length of work period, and enables survey work to be carried out with good efficiency.

Since the invention enables a survey to be conducted based on actually photographed images, the survey can be carried out with high objectivity and recorded data can be readily reexamined.

The survey system can be configured to incorporate a submarine mobile video pointing system for monitoring the location of the submarine mobile video system as it takes images, thereby enabling accurate analysis of marine plant distribution.

The above and other objects and features of the invention will become apparent from the following description made with reference to the drawings.

DESCRIPTION OF THE PREFERRED EMBODIMENT

An embodiment of the present invention will now be explained with reference to the drawings.

Figure 1:
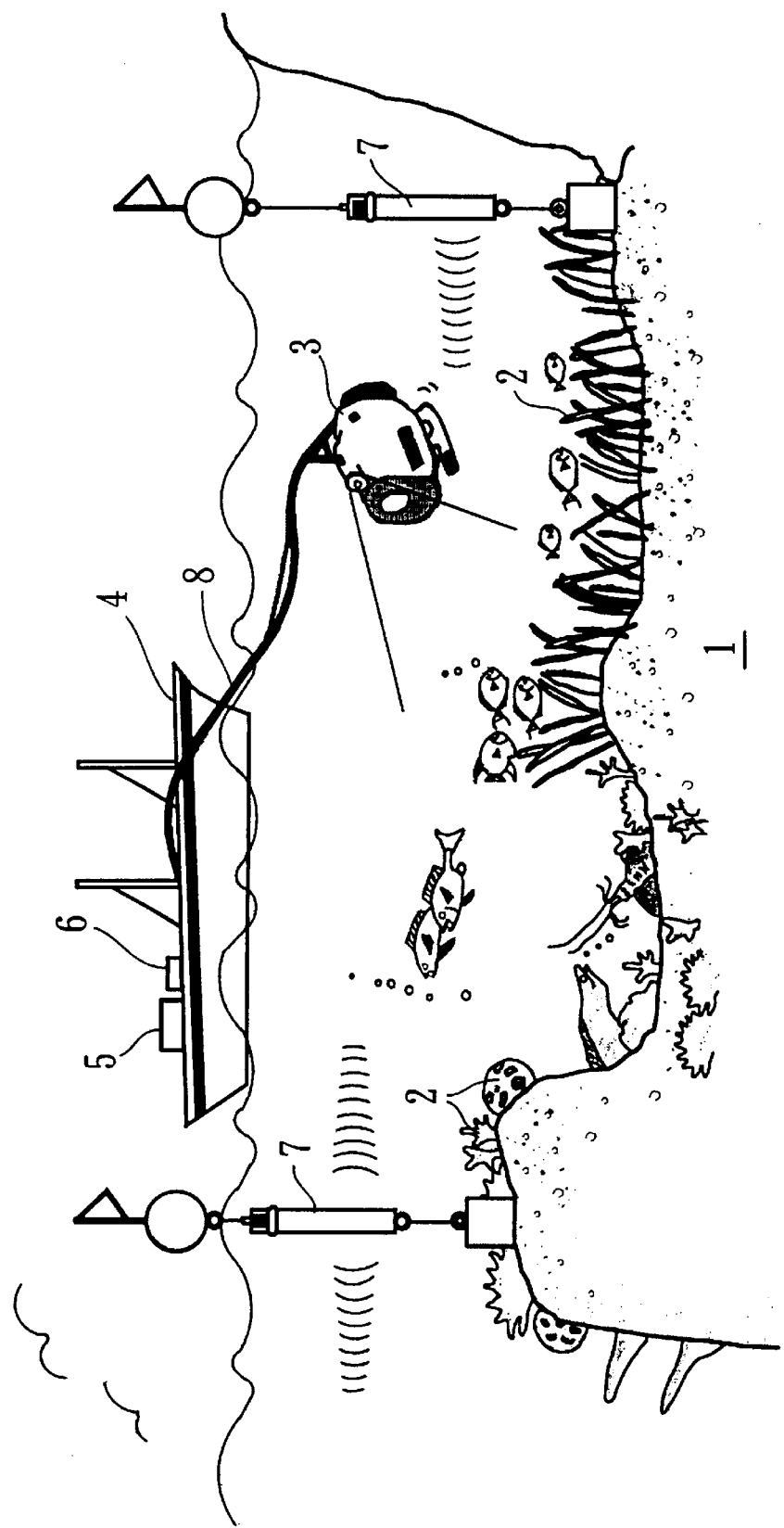
FIG. 1 is a diagram for explaining the invention method of surveying macrophytes at a marine plant field.

FIG. 1 is a diagram for explaining the invention method of surveying macrophytes at a marine plant field.

Numerous macrophytes 2 of various forms proliferate in a marine plant field 1. Acoustic transponders 7 are installed on the seabed in the marine plant field 1 at the apices of a triangle measuring about 1,000–1,500 m per side, the distance over which sonic distance measurement can be accurately performed. The locations at which the acoustic transponders 7 are installed are determined using the GPS (Global Positioning System). Specifically, distance measurement is conducted in the vicinity of the acoustic transponders 7 using sound waves, the position of a ship 4 is simultaneously determined by GPS, and the results are processed by computer to ensure the highest possible positioning of the acoustic transponders 7. Knowledge of the precise positions of the acoustic transponders 7 enhances the precision of the acoustic positioning.

Figure 2:
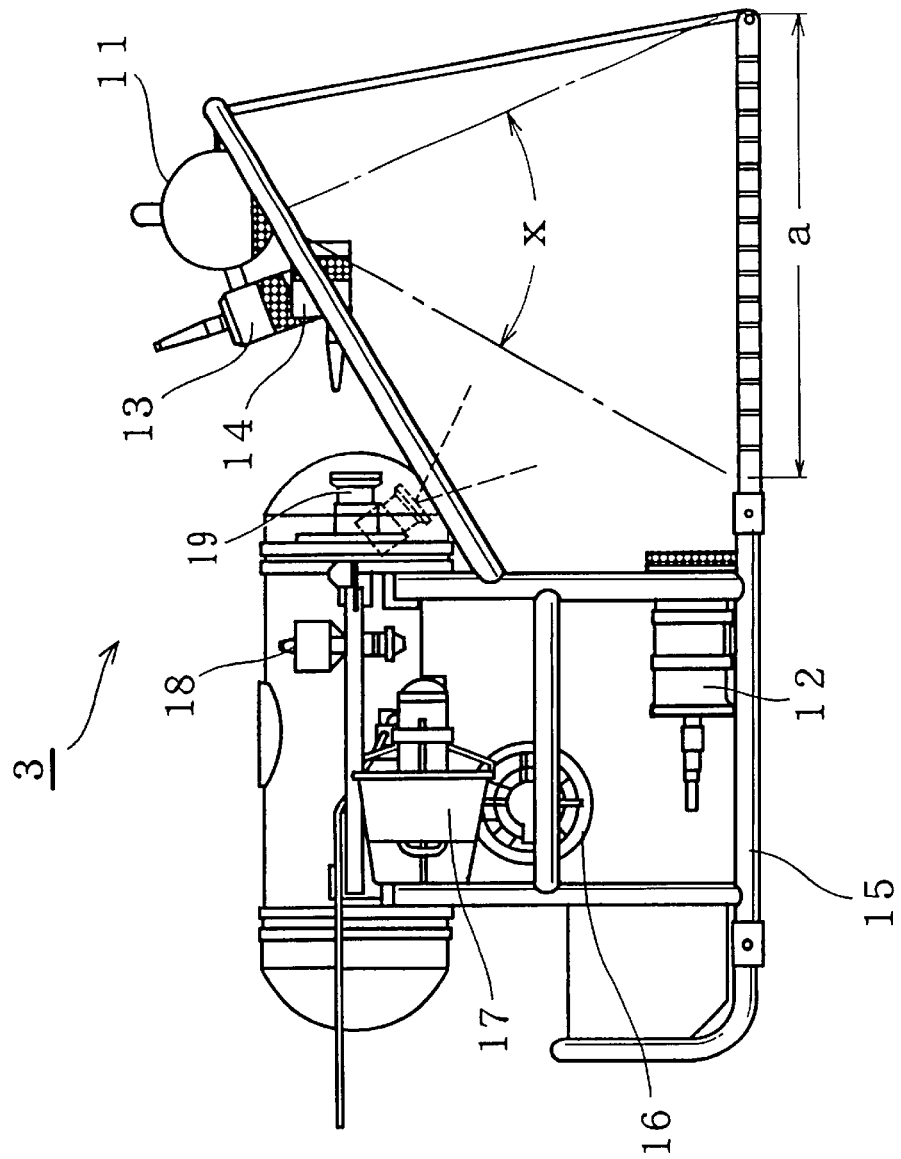
FIG. 2 is a front view showing an example of a submarine video system used to implement the marine plant survey method according to the invention.

A submarine mobile video system 3 is provided for taking images of the seabed of the marine plant field 1 while moving about freely within the underwater region enclosed by the acoustic transponders 7. The submarine mobile video system 3 is shown in detail in FIG. 2. It is structured to be loadable on a small boat capable of approaching a coral reef or the like. On a frame 15 of the submarine mobile video system 3 are mounted a still camera 11 capable of taking high-resolution, wide-angle images of macrophytes from above, a movable camera 12 movably mounted on a manipulator for taking high-resolution images of macrophytes from a direction other than from above, a strobe 13, an underwater floodlight 14, a transceiver 16 for sending and receiving sound waves, and a propulsion device equipped with a horizontal thruster 17 and a vertical thruster 18 for propelling the submarine mobile video system 3 through the water.

Although a still camera with a wide angle of view can take wider angle-images, an excessively wide angle of view impairs image analysis because the peripheral regions of the images become distorted. The angle of view of the still camera 11 is therefore preferably not greater than 90°. When the angle of view is 90°, each side of the imaged region is equal to twice the distance from the camera and images can be taken even in shallow water with little risk of the still camera 11 rising above the sea surface.

In this specification, expressions such as "from above the macrophytes" refer to positions located higher than the upper end of the macrophytes being imaged and in an angular direction substantially directly above the macrophytes, and expressions such as "from other than above the macrophytes" refer to positions located elsewhere than directly or almost directly above the macrophytes being imaged and typically include positions directly or nearly lateral of the macrophytes and positions in an angular direction somewhat above or below directly lateral of the macrophytes.

The submarine mobile video system 3 is further equipped with a monitor video camera 19 for enabling an operator on board the ship 4 to monitor the operation of the submarine mobile video system 3 and the state of the seabed. The transceiver 16 and the acoustic transponders 7 are configured to constitute a submarine mobile video pointing system. Specifically, they are configured so that when the transceiver 16 transmits sound waves of a frequency of about 20 KHz, the acoustic transponders 7 receiving the sound waves reply by transmitting sound waves of different frequencies. The transceiver 16 receives the sound waves from the acoustic transponders 7 and calculates the distance between itself and each acoustic transponder 7 based on the time between sound wave transmission and reception. The submarine mobile video system 3 equipped with the transceiver 16 can therefore constantly determine its current position.

Alternately, when less precise positioning suffices, the submarine mobile video pointing system can be configured by installing a GPS antenna and related signal processing equipment on the submarine mobile video system 3 so that the position of the submarine mobile video system 3 can be determined directly from GPS signals.

The ship 4 is equipped with a remote controller 5 for controlling the operation of the submarine mobile video system 3 and the imaging direction, location and shutter of the still camera 11 and the movable camera 12, with an image data processor 6 for processing image data acquired by the submarine mobile video system 3, and with a generator not shown in the drawings. The ship 4 and the submarine mobile video system 3 are connected by a cable 8 including a power cable for transmitting electric power generated on the ship 4 to the submarine mobile video system 3 and an optical fiber cable for transmitting operation control signals and image data between the ship 4 and the submarine mobile video system 3.

When a marine plant field 1 is to be surveyed, at least three acoustic transponders 7 are first installed within the marine plant field 1 at the apices of at least one triangle measuring 1,000–1,500 m per side. The submarine mobile video system 3 is then loaded on the ship 4 and hauled to the sea area installed with the acoustic transponders 7. At this time, the locations of the acoustic transponders 7 are determined by GPS measurement, numerous sonic distance measurements are made in the vicinity of the acoustic transponders 7, the location of the ship 4 is determined by GPS, and the results are processed by computer to determine the locations of the acoustic transponders 7 to within several tens of cm. The triangular area enclosed by the acoustic transponders 7 whose locations have been precisely determined is defined as the survey point.

Next, the submarine mobile video system 3 is lowered into the sea from the ship 4 and an operator on the ship 4 uses the remote controller 5 to remotely control the movement of the submarine mobile video system 3 so as to direct it to the seabed at the survey point. When the submarine mobile video system 3 reaches the seabed at the survey point, the operator instructs the transceiver 16 to transmit sound waves of a frequency of around 20 KHz. Upon receiving the sound waves, each acoustic transponder 7 replies by transmitting sound waves of a different frequency from the other acoustic transponders 7. The transceiver 16 receives these sound waves and calculates the distance between itself and each acoustic transponder 7 from the round-trip time of the sound waves. The remote controller 5 can therefore accurately ascertain and record the position of the submarine mobile video system 3 in real time.

The operator then operates the remote controller 5 to transmit signals for operating the shutter of the still camera 11 so as to take an image of the macrophytes 2 from above. Since the still camera 11 is fixed at a prescribed height on the frame 15 and its angle of view x is set beforehand, macrophytes 2 in a prescribed region a FIG. 2) are imaged every time the shutter is operated. The degree of coverage by the macrophytes 2 within a prescribed region can therefore be ascertained from the image. In parallel with the foregoing, the operator operates the remote controller 5 to transmit signals for positioning the movable camera 12 for imaging macrophytes 2 from a direction other than from above, e.g., for imaging macrophytes 2 from a direction somewhat higher than directly lateral, and for operating the movable camera 12 to image the macrophytes 2 from close range as it moves. The species, height and the like of the macrophytes 2 can be ascertained from the image data from the movable camera 12. Imaging of macrophytes is facilitated by the movability of the camera. The high-resolution image data acquired by the still camera 11 and the movable camera 12 are processed by the image data processor 6 on the ship 4 to discriminate the degree of macrophytes coverage, and their species, height and the like at the survey point.

When image taking in the foregoing manner has been completed at one survey point, the ship 4 moves to the next survey point and the system operator simultaneously operates the submarine mobile video system 3 to follow the ship. At the next survey point, the location of the submarine mobile video system 3 is determined and imaging is conducted in the same manner as at the preceding survey point.

Survey points can be selected in various ways. One effective way is to move the ship 4 and the submarine mobile video system 3 through the sea while using the monitor video camera 19 to observe the seabed for changes in macrophyte species, degree of coverage, height and the like, and to select a region where such changes are noted as a survey point.

As explained in the foregoing, a selected marine plant field survey region is surveyed by repeating position measurement and imaging operations at each selected survey point defined by installing three transponders. The acquisition of image data together with positional data regarding each successive survey point in this manner makes it possible to obtain accurate information regarding the marine plant field location and size, and the degree of coverage, species, height and the like of the macrophytes in the marine plant field.

As explained in the forgoing, the invention provides a survey method and system that enable information to be accurately acquired directly over a wide area regarding macrophyte distribution, degree of coverage, species and height at marine plant fields, while minimizing exposure of survey personnel to dangers.

Since the invention also allows an operator on a ship to remotely control the submarine mobile video system while monitoring video camera images of the submarine mobile video system operation and the seabed, the invention provides a marine plant field survey method and survey system that do not require a skilled diver with expert knowledge, are much safer than methods and systems requiring underwater work, and can be operated efficiently with no particular limitation on work period.

Since the invention records the images taken by the submarine mobile video system using a video recorder installed on the ship, surveys can be conducted with high objectivity and recorded data can be readily reexamined.

Since the invention monitors the location of the submarine mobile video system as it conducts the survey, it provides a survey method and survey system enabling accurate determination of marine plant distribution.

Since the invention can determine the position of the submarine mobile video system with high accuracy, it enables positional data to be recorded and rapidly processed together with the image data using a portable personal computer or the like installed on the ship.

What is claimed is:

1. A marine plant field survey method comprising the steps of:

determining points defining a seabed survey area from measurements performed with a Global Positioning System (GPS);

disposing acoustic transponders at the determined points defining the seabed survey area;

supplying a first remote control signal to a submarine mobile video system;

moving the submarine mobile video system to a survey point within the seabed survey area under control of the first remote control signal received by the submarine mobile video system;

supplying a second remote control signal and a third remote control signal to the submarine mobile video system;

controlling a first camera mounted on the submarine mobile video system to take first wide-field images of macrophytes as viewed from above the macrophytes under control of the second remote control signal received by the submarine mobile video system to provide an indication of the degree of coverage by the macrophytes within a prescribed region of the seabed survey area and simultaneously controlling a second camera mounted on the submarine mobile video system to take second images of the macrophytes with an orientation other than from above the macrophytes to establish a view with different orientation from the view from above the macrophytes provided by the first camera under control of the third remote control signal received by the submarine mobile video system to enable determination of a macrophyte species as to the macrophytes under observation from the second images.

2. The method according to claim 1, further comprising the step of determining a submarine mobile video system operation state and a seabed state from a display of a monitor video camera mounted on the submarine mobile video system.

3. The method according to claim 1, further comprising the steps of:

providing the submarine mobile video system with a transmitter and a receiver; and calculating a distance between the submarine mobile video system and each of the acoustic transponders based upon a time of transmitting a signal to each of the acoustic transponders from the transmitter and a time of receiving a corresponding signal from each of the acoustic transponders at the receiver to thereby determine a present position of the submarine mobile video system in the seabed survey area.

4. A marine plant field survey apparatus comprising:

transponders that are each disposed at a predetermined point of a seabed survey area, each said predetermined point having been determined from measurements made by a Global Positioning System (GPS);

a remote control device configured to provide a first remote control signal, a second remote control signal, and a third remote control signal;

a remote control signal receiver mounted on a submarine mobile video system, wherein the submarine mobile video system includes a propulsion system configured to move the submarine mobile video system to a survey point within the seabed survey area in response to receipt of the first remote control signal by the remote control signal receiver;

a first camera on the submarine mobile video system configured to be responsive to receipt of the second remote control signal by the remote control signal receiver to take first wide-field images of macrophytes as viewed from above the macrophytes to provide an indication of the degree of coverage by the macrophytes within a prescribed region of the seabed survey area; and a second camera mounted on the submarine mobile video system configured to be responsive to receipt of the third remote control signal by the remote control signal receiver to take second images of the macrophytes with an orientation other than from above the macrophytes to establish a view with different orientation from the view from above the macrophytes provided by the first camera to enable determination of a macrophyte species characteristic as to the macrophytes under observation from the second images.

5. The apparatus according to claim 4, wherein the submarine mobile video system has mounted thereon a monitor video camera for taking images of a submarine mobile video system operation state and a seabed state.

6. The apparatus according to claim 4, wherein the submarine mobile video system has mounted thereon a transmitter and a receiver, and the transmitter and receiver constitute a submarine mobile video pointing system in conjunction with the transponders to measure a position of the submarine mobile video system.

7. The apparatus according to claim 4, wherein the submarine mobile video system has attached thereto a GPS antenna to measure a position of the submarine mobile video system from a signal from the GPS antenna.

* * * * *